July 15, 1958 D. H. SMITH 2,843,745
TONE GENERATOR
Filed May 11, 1956
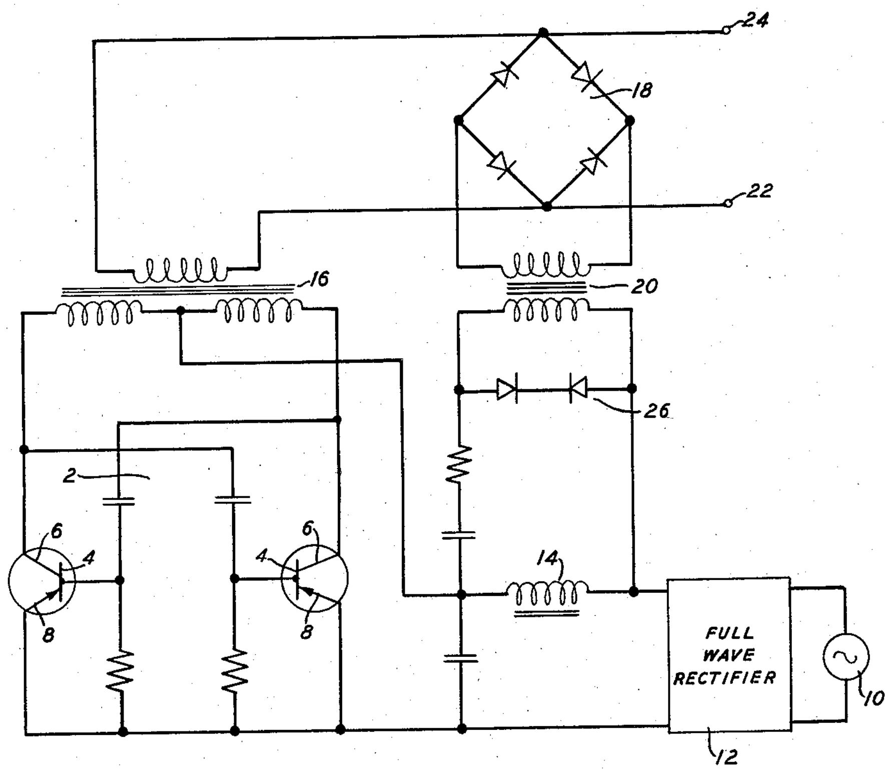
INVENTOR
D. H. SMITH
BY V. P. Friolo
ATTORNEY

United States Patent Office 2,843,745
Patented July 15, 1958

2,843,745

TONE GENERATOR

Donald H. Smith, Livingston, N. J., assignor to Bell Telephone Laboratories, Incorporated, New York, N. Y., a corporation of New York Application May 11, 1956, Serial No. 584,282

3 Claims. (Cl. 250—36)

This invention relates to tone generators, particularly to the type in which a current of one frequency is modulated by a current of another frequency.

A feature of this invention resides in the use of the ripple component of a rectified current as the modulating frequency.

In accordance with the embodiment disclosed herein, a tone is generated by modulating, in a shunt bridge-type modulator, a carrier current generated by a free running multivibrator with the ripple component of the rectified current provided for energizing the multivibrator.

The nature of the invention and its distinguishing features and advantages will be more clearly understood from the following detailed description and the accompanying drawing in which the single figure is a schematic of an embodiment of the invention.

Referring now to the accompanying drawing the multivibrator 2 comprises first and second semiconductor devices. Each device, or transistor, includes a semiconducting body such as a block of germanium crystal having a base electrode 4, a collector electrode 6 and an emitter electrode 8 in contact therewith. The usual biasing voltages are applied to each of the two devices and the cross-connection of the collector electrode of each device to the base electrode of the other device by a capacitor results in a free running multivibrator. The operating voltages for multivibrator 2 are obtained from the direct-current power supply which comprises the alternating-current source 10, the full-wave rectifier 12, and a filter which includes the choke 14. The output of multivibrator 2 is coupled through transformer 16 to opposite terminals of a shunt bridge-type modulator 18. The ripple voltage developed across the filter choke 14 is coupled through transformer 20 to the remaining terminals of the modulator 18 to modulate the carrier frequency provided by the multivibrator. The output of modulator 18 is taken at terminals 22 and 24.

In the particular embodiment of the invention, the carrier frequency provided by the multivibrator is 600 cycles and the ripple frequency is 120 cycles. A transistorized free running multivibrator is used as the source of the carrier frequency because of its low power and small size characteristics. However, other suitable multivibrator structures or sources of carrier frequency may be used. Constant output of the modulating frequency is obtained by means of the shunt regulator 26.

It is to be understood that the above-described arrangements are illustrative of the application of the principles of the invention. Other arrangements may be devised by those skilled in the art without departing from the spirit and scope of the invention.

What is claimed is:

1. A tone generator comprising a source of carrier current, a source of alternating current, means for rectifying said alternating current and producing a direct-current component and a ripple component, means for modulating said carrier current with said ripple component and means for energizing said carrier current source with said direct-current component.

2. A tone generator in accordance with claim 1 wherein said source of carrier current is a multivibrator.

3. A tone generator in accordance with claim 1 wherein said source of carrier current is a multivibrator comprising a semiconductor device.

References Cited in the file of this patent

UNITED STATES PATENTS

| | | |
|---|---|---|
| 2,391,894 | Gorham et al. | Jan. 1, 1946 |
| 2,759,104 | Skellett | Aug. 14, 1956 |